United States Patent
Meyrick et al.

(10) Patent No.: US 6,406,526 B1
(45) Date of Patent: Jun. 18, 2002

(54) PYRIDONAZO DYES AND INKS CONTAINING THEM

(75) Inventors: Barry Huston Meyrick; Mark Holbrook; Roy Bradbury, all of Blackley (GB)

(73) Assignee: Avecia Limited, Blackley (GB)

( * ) Notice: Subject to any disclaimer, the term of this patent is extended or adjusted under 35 U.S.C. 154(b) by 0 days.

(21) Appl. No.: 09/446,413

(22) Filed: Mar. 9, 2000

(30) Foreign Application Priority Data

Jun. 21, 1997 (GB) ............................................. 9713215
Jun. 21, 1997 (GB) ............................................. 9713216

(51) Int. Cl.$^7$ ........................... C09D 11/02; C09B 29/42
(52) U.S. Cl. ................. 106/31.48; 106/31.5; 106/31.51; 534/772
(58) Field of Search .............................. 106/31.48, 31.5, 106/31.51; 534/772

(56) References Cited

U.S. PATENT DOCUMENTS

| 4,734,349 A | 3/1988 | Chapman et al. | ............ | 430/106 |
| 5,189,008 A | * 2/1993 | Murata et al. | .............. | 503/227 |
| 5,246,911 A | * 9/1993 | Murata et al. | .............. | 503/227 |

FOREIGN PATENT DOCUMENTS

| DE | 20 04 487 | 8/1971 |
| EP | 0 442 466 | 8/1991 |
| FR | 2 280 688 | 2/1976 |
| FR | 2 338 310 | 8/1977 |
| GB | 2 167 427 | 5/1986 |
| JP | 52-144031 | 12/1977 |
| JP | 54-70337 | 6/1979 |
| JP | 60-152563 | 8/1985 |
| JP | 02-243395 | 9/1990 |
| JP | 05-169849 | 7/1993 |
| JP | 05-255602 | 10/1993 |
| JP | 08-108637 | 4/1996 |

* cited by examiner

Primary Examiner—Helene Klemanski
(74) Attorney, Agent, or Firm—Pillsbury WInthrop LLP

(57) ABSTRACT

A dye of Formula (1) or tautomer thereof:

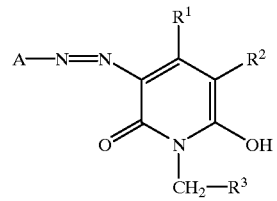

Formula (1)

wherein:

A is di-, tri-, tetra-, or penta-substituted phenyl;

$R^1$ is methyl;

$R^2$ is H, CN, alkyl, substituted alkyl, alkenyl, substituted alkenyl, alkynyl, substituted alkynyl, aryl, substituted aryl or a carbonamido group; and $R^3$ is 5- or 6-membered ring comprising carbon atoms and one or two O, N and/or S atoms, wherein the ring may be substituted are useful as a component for inks, especially, ink jet printing inks and provide good storage stability, and high color strength. Inks containing the dye of formula (1) with a water dissipatable polymer in an aqueous medium produce images having high light-fastness and water-fastness and may be printed on various substrates, including paper, overhead transparencies and textiles, and may be applied using ink jet printers.

28 Claims, No Drawings

PYRIDONAZO DYES AND INKS CONTAINING THEM

This invention relates to dyes, to inks and to their use in ink jet printing.

Ink jet printing methods involve printing an image onto a substrate using ink droplets emitted from a small nozzle without bringing the nozzle into contact with the substrate. Over recent years ink jet printers have become popular because they are quieter and more versatile than impact printers, for example conventional basket typewriters are noisy and the images they can print are restricted to the shapes moulded onto the end of each mechanical lever. The most popular ink jet printers are the thermal and piezoelectric.

The requirements for inks used in ink jet printers include:
i) they should not clog the small nozzle from which they are emitted, or form a blocking crust over the end,
ii) the resultant image should have good water-fastness so that it does not smudge excessively on contact with sweat or water,
iii) the image should also have a good light-fastness so that it does not fade quickly on exposure to daylight,
iv) they should dry quickly on paper and give discrete, sharp images,
v) they should have good storage stability, and
vi) they should have a high colour strength to give intensely coloured images.

WO91/06608 describes aqueous inks containing a polyester, water, a pigment and a wax. Whilst these inks are useful in printing presses, the pigments they contain require intensive and expensive milling to make them fine enough to pass through ink jet printer heads and the pigments have a tendency to settle out from the ink on standing for long periods. Furthermore, images formed from inks containing insoluble pigments are generally opaque and dull, limiting their usefulness on overhead projector slides.

There is a need for dyes and inks which have good storage stability, a high colour strength and produce images having a high light-fastness and water-fastness when printed on a substrate.

According a first aspect of the present invention there is provided a dye of the Formula (1) and tautomers thereof:

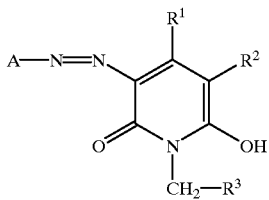

Formula (1)

wherein:
A is optionally substituted phenyl;
$R^1$ is methyl;
$R^2$ is H, CN, optionally substituted alkyl, optionally substituted alkenyl, optionally substituted-alkynyl, optionally substituted aryl or a carbonamido group; and
$R^3$ is an optionally substituted 5- or 6-membered ring.

In a first preferred embodiment A is phenyl or mono substituted phenyl, more preferably mono substituted phenyl.

In a second preferred embodiment A is di-, tri-, tetra- or penta-substituted phenyl.

When $R^2$ is optionally substituted alkyl, alkenyl or alkynyl it is preferably optionally substituted $C_{1-12}$-alkyl, $C_{1-12}$-alkenyl or $C_{1-12}$-alkynyl, more preferably optionally substituted $C_{1-12}$-alkyl, especially $C_{1-4}$-alkyl; more especially methyl:

When $R^2$ is optionally substituted aryl it is preferably optionally substituted phenyl.

$R^2$ is preferably CN or a carbonamido group. A preferred carbonamido group is of the formula $CONHR^4$ wherein $R^4$ is H or optionally substituted alkyl or aryl.

$R^4$ is preferably optionally substituted $C_{1-6}$-alkyl or optionally substituted phenyl, more preferably $C_{1-4}$-alkyl.

$R^3$ is preferably an optionally substituted 5- or 6-membered ring comprising carbon atoms and optionally one or two atoms selected from O, N and S, more preferably one O or S atom and four or five carbon atoms. $R^3$ is more preferably optionally substituted phenyl, cyclohexyl, cyclopentyl, furanyl, tetrahydrofuranyl, pyranyl, dihydropyranyl or tetrahydropyranyl. Still more preferably, $R^3$ is optionally substituted furanyl or tetrahydrofuranyl, especially optionally substituted tetrahydrofuranyl.

Examples of groups represented by $R^3$ include furan-2-yl, tetrahydrofuran-2-yl, furan-3-yl, tetrahydrofuran-3-yl, pyran-2-yl, pyran-3-yl, pyran-4-yl, dihydropyran-2-yl, dihydropyran-3-yl, dihydropyran-4-yl, tetrahydropyran-2-yl, tetrahydropyran-3-yl and tetrahydropyran-4-yl.

In one preferred embodiment at least one of the substituents on A is a hypsochromic substituent. A hypsochromic substituent is a substituent which causes a shift in the absorption maximum of the dye to a shorter wavelength relative to a dye which is identical in every respect except that in place of the substituent there is a hydrogen atom, as measured in $CH_2Cl_2$ at 20° C.

Preferred substituents, most of which are hypsochromic, on A are of the formula $CO_2R^5$, $OCOR^5$, $COR^5$, $COCOR^5$, $SO_2R^5$, $SO_2NH_2$, $SO_2NR^5R^6$, $SOR^5$, $SO_2OR^5$, CN, $CONR^5R^6$, $CONH_2$ and $CF_3$; wherein each $R^5$ independently is optionally substituted phenyl or optionally substituted alkyl which is optionally interrupted by one or more oxygen, sulphur or nitrogen atoms; and each $R^6$ independently is H or a substituent as defined for $R^5$; or $R^5$ and $R^6$ together with the nitrogen to which they are attached form a 5 or 6 membered ring.

Especially preferred hypsochromic substituents are of the formula $CO_2R^7$ and $CONHR^7$ wherein each $R^7$ independently is $[(CH_2)_mO]_nR^8$, m is 2 or 3, n is 1, 2, 3 or 4 and $R^8$ is H or $C_{1-4}$-alkyl.

The optional substituents present on A may also be selected from $NHCOR^5$, wherein $R^5$ is as hereinbefore defined; alkoxy, preferably $C_{1-4}$-alkoxy; alkyl, preferably $C_{1-4}$-alkyl; halo, preferably Cl or F; nitro; hydroxy; and optionally substituted amino, preferably $—NR^aR^b$ wherein $R^a$ and $R^b$ each independently H, $C_{1-4}$-alkyl or $C_{1-4}$-alkyl substituted by hydroxy, carboxy or sulpho.

When $R^5$ and $R^6$ together with the nitrogen to which they are attached form a 5 or 6 membered ring it is preferably optionally substituted morpholine, piperazine, piperidine, piperidone or piperidone monohydrate, more preferably 4-piperidone or 4-piperidone monohydrate.

Preferably $R^5$ is optionally substituted phenyl, optionally substituted $C_{1-4}$-alkyl or $R^7$ wherein $R^7$ is as hereinbefore defined.

Preferably $R^6$ is H or optionally substituted $C_{1-4}$-alkyl, more preferably H.

The optional substituents which may be present on $R^2$, $R^3$, $R^4$ and $R^5$ are preferably selected from $C_{1-4}$-alkoxy, especially methoxy; halo, especially Cl, Br or F; $C_{1-4}$-alkyl, especially methyl; nitro; cyano; $CF_3$ hydroxy; optionally substituted amino, especially —$NR^aR^b$ wherein $R^a$ and $R^b$ are each independently H, $C_{1-4}$-alkyl or $C_{1-4}$-alkyl substituted by hydroxy, carboxy or sulpho; amido, especially —$CONR^aR^b$ wherein $R^a$ and $R^b$ are as hereinbefore defined; or ester, especially —$CO_2R^a$ wherein $R^a$ is as hereinbefore defined other than H.

Preferably in the dyes according to the first preferred embodiment of the invention A is phenyl carrying one group of the formula $CO_2R^7$ wherein $R^7$ is as hereinbefore defined.

Preferably in the dyes according to the second preferred embodiment of the invention A carries a total of 2, 3, 4 or 5 substituents, more preferably 2 or 3 substituents, especially 2 substituents.

More preferably in the dyes of the second preferred embodiment A is phenyl carrying two, more preferably one hypsochromic substituent, and two, more preferably one of the alternative substituents mentioned above.

In view of the foregoing preferences a preferred dye of Formula (1) is of the Formula (2) and tautomers thereof:

Formula (2)

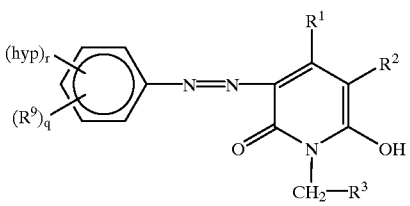

wherein:
each hyp independently is a group of the formula $CO_2R^5$, $OCOR^5$, $COR^5$, $COCOR^5$, $SO_2R^5$, $SO_2NHR^5$, $SO_2NH_2$, $SO_2NR^5R^5$, $SO_2OR^5$, CN, $CONHR^5$, $CF_3$, $CONHR^7$ or $CO_2R^7$;
each $R^9$ independently is alkoxy (preferably $C_{1-4}$-alkoxy), halo, alkyl (preferably $C_{1-4}$-alkyl), nitro, hydroxy or optionally substituted amino;
r is 0, 1 or 2;
q is 0, 1, or 2;
(r+q) is 1, 2, 3 or 4; and
$R^1$, $R^2$, $R^3$, $R^7$ and each $R^5$ independently are as hereinbefore defined.

Preferably $R^2$ in Formula (2) is CN or $CONHR^4$ wherein $R^4$ is as hereinbefore defined.

Preferably $R^3$ in Formula (2) is optionally substituted furanyl or tetrahydrofuranyl, more preferably furanyl or tetrahydrofuranyl.

Preferably $R^5$ in Formula (2) is phenyl or $C_{1-4}$-alkyl.

Each hyp in Formula (2) is preferably independently $CONHR^7$ or $CO_2R^7$.

Preferably each $R^9$ is $C_{1-4}$-alkoxy, $C_{1-4}$-alkyl or halo (especially Cl).

Preferred dyes according to the first preferred embodiment of the invention are of the Formula (2) wherein r is 0 or 1; q is 0 or 1 and (r+q) is 1. More preferably q is 0; r is 1; hyp is $CO_2R^7$; $R^1$ is methyl; $R^2$ is CN; $R^3$ is furanyl or tetrahydrofuranyl, especially tetrahydrofuranyl; and $R^7$ is as defined above.

Preferred dyes according to the second preferred embodiment of the invention are of the Formula (2) wherein (r+q) is 2, 3 or 4, more preferably 2. More preferably r is 0; q is 2; $R^9$ is selected from alkyl and alkoxy (especially $C_{1-4}$-alkyl and $C_{1-4}$-alkoxy); $R^1$ is methyl; $R^2$ is CN; and $R^3$ is furanyl or tetrahydrofuranyl, especially tetrahydrofuranyl.

Preferably the dyes of Formulae (1) and (2) are free from sulpho and carboxy groups.

Dyes of Formula (1) may be prepared diazotising a compound of formula A—$NH_2$ and coupling the resultant diazonium salt to a compound of Formula (3):

Formula (3)

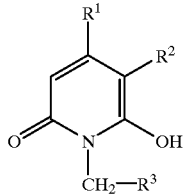

wherein $R^1$, $R_2$, $R^3$ and A are as hereinbefore defined.

The diazotisation is preferably performed at a temperature below 6° C., e.g. –5° C. to +5° C. Typically nitrous acid is used as the diazotising agent and the process is performed in the presence of dilute mineral acid, for example dilute hydrochloric acid.

Compounds of Formula (3) may be prepared by condensing an amine of the formula. $R^3$—$CH_2$—$NH_2$ with a suitable acetates and acetoacetates.

Dyes of Formula (1) exist in tautomeric forms other than that shown above and these tautomers are included in the present invention. For example the azo —N=N— group can tautomerise to a —NH—N= group and, indeed, the hydrazo from is believed to predominate over the azo form.

The dyes of Formula (1) are particularly valuable for the preparation of water-based polymeric inks for ink jet printing. Accordingly a second feature of the invention provides an ink comprising an aqueous medium, a water-dissipatable polymer and a dye of Formula (1) as hereinbefore defined.

The water-dissipatable polymer preferably bears ionised carboxy and/or sulphonate groups, especially ionised sulphonate groups, because these assist water dissipatability of the polymer. Such groups can be chain pendant and/or terminal.

The water-dissipatable polymer is preferably a water-dissipatable polyester. The water-dissipatable polyester can be prepared using conventional polymerisation procedures known to be effective for polyester synthesis. Thus, it is well known that polyesters contain carbonyloxy (i.e —C(=O)—O—) linking groups and may be prepared by a condensation polymerisation process in which an acid component (including ester-forming derivatives thereof) is reacted with a hydroxyl component. The acid component may be selected from one or more polybasic carboxylic acids, e.g. di- and tri-carboxylic acids or ester-forming derivatives thereof, for example acid halides, anhydrides or esters. The hydroxyl component may be one or more polyhydric alcohols or phenols (polyols), for example, diols, triols, etc. (It is to be understood, however, that the polyester may contain, if desired, a proportion of carbonylamino linking groups —C(=O)—NH— (i.e. amide linking groups) by including an appropriate amino functional reactant as part of the "hydroxyl component"; such as amide linkages). The reaction to form a polyester may be conducted in one or more stages. It is also possible to introduce in-chain unsaturation into the polyester by, for example, employing as part of the acid component an olefinically unsaturated dicarboxylic acid or anhydride.

Polyesters bearing ionised-sulphonate groups may be prepared by using at least one monomer having two or:more functional groups which will readily undergo an ester condensation reaction (e.g. carboxyl groups, hydroxyl groups or esterifiable derivatives thereof) and one or more sulphonic acid groups (for subsequent neutralisation after polyester formation) or ionised sulphonate groups (i.e. neutralisation of the sulphonic acid groups already having been effected in the monomer) in the synthesis of the polyester. In some cases it is not necessary to neutralise sulphonic acid groups since they may be sufficiently strong acid groups as to be considerably ionised in water even without the addition of base. Often, the sulphonic acid or ionised sulphonate containing monomer is a dicarboxylic acid monomer having at least one ionised sulphonate substituent (thereby avoiding any need to effect neutralisation subsequent to polyester formation). (Alternatively, alkyl carboxylic acid ester groups may be used in place of the carboxylic acid groups as ester-forming groups). Such a monomer will therefore be part of the acid component used in the polyester synthesis.

Preferred polybasic carboxylic acids which can be used to form the polyester have two or three carboxylic acid groups. For example, one can use $C_4$ to $C_{20}$ aliphatic, alicyclic and aromatic compounds having two or more carboxy groups and their ester forming derivatives (e.g. esters, anhydrides and acid chlorides), and dimer acids such as C36 dimer acids. Specific examples include adipic acid, fumaric acid, maleic acid, succinic acid, itaconic acid, sebacic acid, nonanedioic acid, decanedioic acid, 1,4-cyclohexanedicarboxylic acid, 1,3-cyclohexanedicarboxylic acid, 1,2-cyclohexanedicarboxylic acid, terephthalic acid, isophthalic acid, phthalic acid and tetrahydrophthalic acid and their acid chlorides. Anhydrides include succinic, maleic, phthalic and hexahydrophthalic anhydrides.

Preferred polyols which can be used to form the polyester include those having from 2 to 6, more preferably 2 to 4 and especially 2 hydroxyl groups per molecule. Suitable polyols having two hydroxy groups per molecule include diols such as 1,2-ethanediol, 1,3-propanediol, 1,4-butanediol, 1,6-hexanediol, 2,2-dimethyl-1,3-propanediol (neopentyl glycol), the 1,2-, 1,3- and 1,4-cyclohexanediols and the corresponding cyclohexane dimethanols, diethylene glycol, dipropylene glycol, and diols such as alkoxylated bisphenol A products, e.g. ethoxylated or propoxylated bisphenol A. Suitable polyols having three hydroxy groups per molecule include triols such as trimethylolpropane (1,1,1-tris (hydroxymethyl)ethane). Suitable polyols having four or more hydroxy groups per molecule include pentaerythritol (2,2-bis(hydroxymethyl)-1,3-propanediol) and sorbitol (1,2,3,4,5,6-hexahydroxyhexane).

Compounds having two or more groups which readily undergo an ester condensation reaction and have one or more sulphonate groups are dicarboxylic acid monomers having at least one ionised sulphonate group. Examples of such compounds are aromatic dicarboxylic acids having an ionised sulphonate group, for example those of the formula:

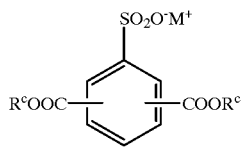

wherein M is a cation (preferably sodium, lithium or potassium); and each $R^c$ independently is H, a cation or $C_{1-4}$-alkyl (preferably methyl or ethyl). Preferred compounds of the above formula are of formula:

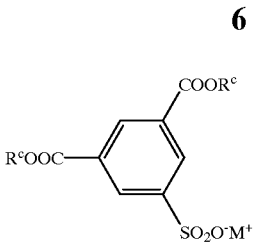

wherein M and $R^c$ are as defined above. Particularly preferred is the mono sodium salt, this material being known as sodio-5-sulphoisophthalic acid (SSIPA).

Other useful compounds which have two or more groups which readily undergo an ester condensation reaction and have one or more sulphonate groups are dihydroxy monomers having at least one sulphonate group, especially those of the formula:

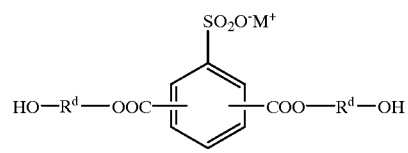

wherein M is as hereinbefore defined above and each $R^d$ independently is alkylene, preferably $C_{2-4}$-alkylene. Preferred compounds of the above formula are:

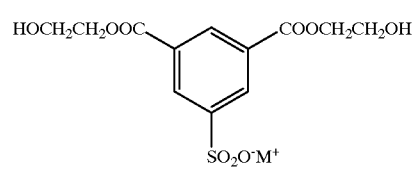

wherein M is as hereinbefore defined.

Polyesters bearing ionised carboxy groups can be prepared by various means. For example, if the hydroxyl component of the reactants is stoichiometrically in excess of the acid component, a hydroxyl-terminated polyester can be formed, which may be subsequently converted to a carboxy terminated polyester by wholly or partially reacting the hydroxyl groups with an appropriate reagent (e.g. an acid anhydride or a dicarboxylic acid). Alternatively, terminal carboxy functionality may be directly introduced by employing an appropriate stoichiometric excess of the acid component reactants. In another alternative, chain-pendant carboxy groups may be introduced by using reagents such as dimethylol propionic acid (DMPA) since if appropriate reaction condition are employed (e.g. polymerisation temperature below 150° C.) the hindered carboxy group thereof does not take part to any significant extent in the ester-forming reactions during the polyester synthesis and the DMPA effectively behaves as a simple diol. Chain-pendant and/or terminal carboxy groups could also be introduced by employing a tri- or higher functionality carboxylic acid or anhydride in the polyester synthesis, for example, trimellitic acid or anhydride. Combinations of the above procedures could also be used. It is thus seen that terminal or side-chain carboxy groups or both can be introduced as desired. These can be fully or partially neutralised with an appropriate base to yield ionised carboxy groups. The counter ions used may be as for the ionised sulphonate groups described above (apart from $H^+$ since the carboxylic acid groups themselves are normally insufficiently ionised to provide a significant amount of ionised carboxy groups—although F substituents would increase acid strength), with alkali metal ions such as Na$^+$, Li$^+$ and K$^+$ again being particularly preferred, and ammonium and organic amine derived cations less preferred because some have an undesirable odour.

The water-dissipatable polyester may optionally have hydrophilic non-ionic segments, for example within the polyester backbone (i.e. in-chain incorporation) or as chain-pendant or terminal groups. Such groups may act to contribute to the dispersion stability or even water-solubility of the polyester. For example, polyethylene oxide chains may be introduced into the polyester during its synthesis by using as part of the hydroxyl component, ethylene oxide-containing mono, di or higher functional hydroxy compounds, especially polyethlene glycols and alkyl ethers of polyethylene glycols, examples of which include:

R$^e$—O—(CH$_2$CH$_2$O)$_n$—H

HO—(CH$_2$CH$_2$O)$_n$—H

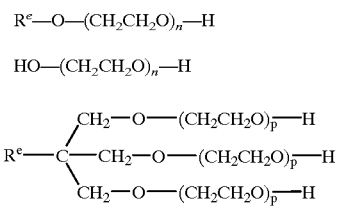

wherein R$^e$ is C$_{1-20}$-alkyl, preferably C$_{1-4}$-alkyl, more preferably methyl; n is 1 to 500; and p is 1 to 100.

A small segment of a polyethylene oxide chain could be replaced by a propylene oxide or butylene oxide chainin such non-ionic groups, but should still contain ethylene oxide as a major part of the chain.

The amount of ionised sulphonate and/or carboxy groups present in the polyester should be sufficient to provide or contribute to water-dissipatability of the polyester, although it should not be so high as to render the resulting polyester unacceptably water-sensitive. This amount will depend, inter alia, on factors such as the hydrophilicity/hydrophobicity of units provided by other monomers in the polyester synthesis or any surfactants (if used), and also the relative proportions of ionised sulphonate/carboxy groups. With regard to the last mentioned point, ionised sulphonate groups are more effective at providing or contributing to water-dissipatability than ionised carboxy groups and so can be used at considerably lower levels in comparison to ionised carboxy groups.

If the polyester is wholly or predominantly sulphonate stabilised (by which is meant the water dissipatability-providing groups are provided wholly or predominately by ionised sulphonate groups). The ionised sulphonate group content is preferably within the range from 7.5 to 100 milliequivalents (more preferably 10 to 75 milliequivalents and particularly 11 to 56 milliequivalents) per 100 g of polyester. When using SSIPA as the monomer for providing the ionised sulphonate groups, the amount of this monomer used in the polyester synthesis, based on the weight of all the monomers used in the polyester synthesis, will usually be within the range from 2 to 20% by weight (more usually 3 to 15% by weight). The carboxylic acid value (AV) of the polyester which is predominantly sulphonate stabilised, i.e. an AV based on the carboxylic acid groups only (i.e. excluding sulphonate groups) will generally be within the range of from 0 to 100 mgKOH/g, more preferably 0 to 50 mgKOH/g, especially 0 to 25 mgKOH/g, more especially 0 to 10 mgKOH/g.

If the polyester is predominantly stabilised by ionised carboxy groups, the carboxylic acid value AV of the polyester is preferably within the range of from 20 to 140 mgKOH/g (more preferably 30 to 100 mgKOH/g).

Usually, the polyester is either predominantly sulphonate-stabilised or predominantly carboxylate stabilised (preferably the former).

If the polyester contains polyethylene oxide chains, the polyethylene oxide chain content should preferably not exceed 25% by weight (and more preferably should not exceed 15% by weight), based on the total weight of the polyester, in order to avoid unacceptable water-sensitivity. Therefore the amount is preferably 0 to 25% by weight (more preferably 0 to 15% by weight) based on the total weight of polyester.

The water-dissipatable polyester preferably has a number average molecular weight Mn of up to 30,000. The Mn is preferably in the range from 500 to 30,000, more preferably 1000 to 25,000, especially 2000 to 20,000. These Mn lead to particularly good storage stability for the resultant inks. The measurement of Mn is well known to those. skilled in the art, and may for example be effected using gel permeation chromatography in conjunction with a standard polymer such as polystyrene or polymethylmethacrylate of known molecular weight.

The water-dissipatable polyester preferably has a hydroxyl number of from 0 to 225 mg KOH/g, more preferably 0 to 125 mg KOH/g, especially from 0 to 50 mgKOH/g.

The Tg of the water-dissipatable polyester (i.e. the temperature at which the polymer changes from a glassy, brittle state to a plastic, rubbery state) is preferably in the range −38° C. to 105° C., more preferably −20 to 70° C., especially −10° C. to 60° C.

The esterification polymerisation processes for making the polyesters for use in invention composition are known and need not be described here in more detail. Suffice to say that they are normally carried out in the melt using catalysts, for example a tin-based catalyst, and with the provision for removing any water or alcohol formed from the condensation reaction.

The water-dissipatable polyester may be dissipated in water by adding the solidified melt directly into water. The solidified melt is preferably in a form such as flake (which can often be obtained directly from the melt) or communised solid (obtained for example by grinding). Alternatively, water can be added directly to the hot polyester melt until the desired solids content/viscosity is reached. Still further, the polyester may be dissipated in water by adding an aqueous pre-dissipation (or organic solvent solution) of the polyester to the water phase.

The water-dissipatable polyesters normally do not need an external surfactant when being dissipated into water, although such surfactants may be used to assist the dissipation if desired and in some cases can be useful in this respect because additional surfactants reduce the required amount of dissipating groups (i.e. sulphonate, and (mono alkoxy) polyalkylene chains if used).

Water-dissipatable polyesters can also be purchased from Eastman Kodak Company and Zeneca Limited. Examples include Eastman AQ29D and AQ55W.

The water-dissipatable polymer may also be formed by performing free radical polymerisation of olefinically unsaturated monomers in the presence of a polyester. This gives what could be called a polyester-acrylic hybrid. Olefinically unsaturated monomers which can be used include olefinically unsaturated carboxy functional monomers, e.g. acrylic acid, methacrylic acid, fumaric acid, itaconic acid and β-carboxyethyl acrylate; olefinically unsaturated monomers which are free from carboxy and hydroxy groups, e.g. 1,3-butadiene, isoprene, styrene, vinylidene halides, vinylidene esters and esters of acrylic acid and methacrylic acid, e.g. methyl (meth) acrylate, ethyl (meth)acrylate n-butyl (meth)acrylate and 2-ethyl hexyl (meth)acrylate; and olefinically unsaturated monomers having a hydroxy group e.g. N-methylol (meth)acrylamide and hydroxy $C_{2-8}$-alkyl esters of (meth)acrylic acid. If the polyester has been prepared using a component which has unsaturation therein, e.g. fumaric acid, maleic acid or muconic acid or allyl-containing dihydroxy or dicarboxy compounds, the product from the polyesterification reaction will have unsaturation incorporated into its structure which can take part in the free radical polymerisation to give a graft copolymer. The free radical polymerisation processes use a free-radical generating initiator system such as (for example) the redox radical initiator system tertiary butylhydroxide/isoascorbic acid and will take place in the aqueous phase, rather than in the melt. However, excessive amounts of acrylic polymer (whether formed in the presence of polyester which has unsaturation or is free from unsaturation) often leads to a deterioration in ink properties and it is preferred that no acrylic polymer is present or, if its is present, the amount is less than 40%, preferably less than 30%, more preferably less than 10% by weight relative to the weight of polyester.

Preferably the aqueous medium is water or a mixture of water and one or more organic solvent, more preferably a mixture comprising water, one or more water-immiscible organic solvent and one or more water-miscible organic solvent.

Preferred dyes in the ink are the preferred dyes according to the first aspect of the invention, more preferably the dyes of the Formula (2).

Preferably the dye of Formula (1) dyes the water-dissipatable polymer to give a coloured water-dissipatable polymer in the ink. The water-dissipatable polymer may be dyed prior to inclusion in the ink or may be dyed during the preparation of the ink.

The water-dissipatable polymer may be dyed by heating a water-dissipatable polymer and a dye of Formula (1) at an elevated temperature, for example at a temperature in the range 35 to 150° C., preferably from 40 to 90° C. Simply mixing the dye and polymer in water at room temperature leads to a slight up-take of colour but heating is usually necessary for a full dyeing.

Preferably inks according to the invention are prepared by mixing together (i) a solution of a dye of Formula (1) in a water-immiscible solvent and (ii) a mixture of a water-dissipatable polymer, water-miscible solvent and optionally water. Equally the inks may be prepared by mixing together (i) a solution of a dye of Formula (1) in a mixture of a water-miscible solvent and a water-immiscible solvent and (ii) a water-dissipatable polymer and optionally water. In either case, if there is no water in component (ii) the water may be added to the mixture of (i) a (ii) subsequently to give an ink according to the invention. However it is preferred for component (ii) to contain water. These processes lead to particularly good up-take of dye by the polymer to give intensely coloured inks.

The amount of dye and water-dissipatable polymer contained in the ink will vary according to the depth of shade required. Typically, however, the ink will comprise:

(a) from 0.5 to 10 parts, more preferably 1 to 5 parts of a dye of Formula (1) (or more preferably of Formula (2));

(b) from 2 to 25 parts, more preferably 5 to 15 parts of a water-dissipatable polymer (preferably a water-dissipatable polyester);

(c) from 40 to 90 parts, more preferably from 50 to 80 parts of water; and (d) from 0 to 60 parts, more preferably 5 to 40 parts of organic solvent; wherein all parts are by weight and the total number of parts of (a)+(b)+(c)+(d) add up to 100.

The number of parts of the water-dissipatable polymer is calculated on a 100% solids basis. For example 50 g of a 20% solids polymer is taken as 10 g of polymer.

As hereinbefore mentioned, the ink may contain an organic solvent (e.g. component (d) above) and this may be a mixture of organic solvents. In a preferred embodiment the ink contains an organic solvent consisting of a water-miscible organic solvent and a water-immiscible organic solvent.

Suitable water-immiscible organic solvents include aromatic hydrocarbons, e.g. toluene, xylene, naphthalene, tetrahydronaphthalene and methyl naphthalene; chlorinated aromatic hydrocarbons, e.g. chlorobenzene, fluorobenzene, chloronaphthalene and bromonaphthalene; esters, e.g. butyl acetate, ethyl acetate, methyl benzoate, ethyl benzoate, benzyl benzoate, butyl benzoate, phenylethyl acetate, butyl lactate, benzyl lactate, diethyleneglycol dipropionate, dimethyl phthalate, diethyl phthalate, dibutyl phthalate, di (2-ethylhexyl) phthalate; alcohols having six or more carbon atoms, e.g. hexanol, octanol, benzyl alcohol, phenyl ethanol, phenoxy ethanol, phenoxy propanol and phenoxy butanol; $C_{5-14}$ ethers, e.g. anisole and phenetole; nitrocellulose, cellulose ether, cellulose acetate; low odour petroleum distillates; turpentine; white spirits; naphtha; isopropylbiphenyl; terpene; vegetable oil; mineral oil; essential oil; and natural oil; and mixtures of any two or more thereof. Benzyl alcohol is especially preferred.

Suitable water-miscible organic solvents include $C_{1-5}$-alkanols, e.g. methanol, ethanol, n-propanol, isopropanol, n-butanol, sec-butanol, tert-butanol and isobutanol; amides, e.g. dimethylformamide and dimethylacetamide; ketones and ketone alcohols, e.g. acetone and diacetone alcohol; $C_{2-4}$-ether, e.g. tetrahydrofuran and dioxane; alkylene glycols or thioglycols containing a $C_2$–$C_6$ alkylene group, e.g. ethylene glycol, propylene glycol, butylene glycol, pentylene glycol and hexylene glycol; poly(alkylene-glycol)s and thioglycol)s, e.g. diethylene glycol, thiodiglycol, polyethylene glycol and polypropylene glycol; polyols, e.g. glycerol and 1,2,6-hexanetriol; and lower alkyl glycol and polyglycol ethers, e.g. 2-methoxyethanol, 2-(2-methoxyethoxy)ethanol, 2-(2-ethoxyethoxy) ethanol, 2-(2-butoxyethoxy)ethanol, 3-butoxypropan-1-ol, 2-[2-(2-methoxyethoxy)-ethoxy] ethanol, 2-[2-(2-ethoxyethoxy)ethoxy]-ethanol; cyclic esters and cyclic amides, e.g. optionally substituted pyrrolidones; sulpholane; and mixtures containing two or more of the aforementioned water-miscible organic solvents. Preferred water-miscible organic solvents are $C_{1-6}$-alkyl mono ethers of $C_{2-6}$-alkylene glycols and $C_{1-6}$-alkyl mono ethers of poly($C_{2-6}$-alkylene glycols).

Component (d) of the above mentioned inks preferably comprises;

(i) 5 to 50% of a water-immiscible alcohol having at least six carbon atoms, (especially benzyl alcohol); and (ii) 50 to 95% of a water-miscible solvent comprising
  (a) a cyclic ester or cyclic amide (especially an optionally substituted pyrrolidone);
  (b) a water-miscible $C_{1-6}$-alkyl mono ether of a $C_{2-6}$-alkylene glycol or $C_{1-6}$-alkyl mono ether of poly ($C_{2-6}$-alkylene glycol); or
  (c) a mixture of (a) and (b).

wherein all % are by weight and add up to 100%.

The water-immiscible solvent preferably has a solubility in water at 20° C. of up to 50 g/l. The water-miscible solvent preferably has a solubility in water at 20° C. of more than 50 g/l.

The preferred optionally substituted pyrrolidones, are 2-pyrrolidone, dimethyl pyrrolidone, N-methyl-2-pyrrolidone, N-ethyl-2-pyrrolidone and N-(2-hydroxyethyl)-2-pyrrolidone and mixtures thereof.

The ratio of water-miscible organic solvent to water-immiscible organic solvent is preferably 19:1 to 1:1, more preferably 8:1 to 1:1, especially 5:1 to 1:1.

Dyes of Formula (1) have advantages over the use of pigments in that less dye is usually required than would be the case for a pigment, expensive milling is avoided, the inks are less likely to form a precipitate on standing, a far greater variety of shades are available and the resultant prints have good transparency. The latter quality is particularly important for the production of coloured substrates which require transparency, for example over-head projector slides and colour filters used in LCD television screens. The inks and dyes of the present invention also benefit from good light- and water-fastness.

A valuable feature of the invention is the low tendency for blocking the nozzles of thermal ink jet printers. Many other water dispersible polymer inks work poorly or even not at all in thermal printers. Inks of the invention form discrete droplets on the substrate with little tendency for diffusing. Consequently sharp images can be obtained, resulting in excellent print quality and little if any bleed between colours printed side-by side.

According to a third aspect of the present invention there is provided a process for printing an image on a substrate comprising applying thereto an ink containing a dye of the Formula (1) by means of an ink jet printer.

Preferred inks for use in the present process comprise an aqueous medium, a water-dissipatable polymer and a dye of Formula (1) as hereinbefore defined. Especially preferred inks for use in the process are the preferred inks according to the second aspect of the present invention.

The ink jet printer emits droplets of the ink onto a substrate from a nozzle without bringing the nozzle into contact with the substrate. Preferably the ink jet printer is a thermal or piezoelectric ink jet printer.

The substrate is preferably a paper, an overhead projector slide or a textile material. Preferred textile materials are cotton, polyester and blends thereof.

Preferred papers are plain or treated papers which may have an acid, alkaline or neutral character. Examples of commercially available treated papers include HP Premium Coated Paper (available from Hewlett Packard Inc), HP Photopaper (available from Hewlett Packard Inc), Stylus Pro 720 dpi Coated Paper, Epson Photo Quality Glossy Film (available from Seiko Epson Corp.), Epson Photo Quality Glossy Paper (available from Seiko Epson Corp.), Canon HR 101 High Resolution Paper (available from Canon), Canon GP 201 Glossy Paper (available from Canon), and Canon HG 101 High Gloss Film (available from Canon).

When the substrate is a textile material the process for printing an image thereon according to the invention preferably further comprises the step of heating the resultant printed textile, preferably to a temperature of 50° C. to 250° C.

The inks of the present invention may also be used for the preparation of colour filters, for example those used in flat bed displays.

A fourth aspect of the present invention provides a paper, an overhead projector slide or a textile material printed with an ink according to the second aspect of the present invention or by means of a process according to the third aspect of the present invention.

A fifth aspect of the present invention provides an ink jet printer cartridge containing an ink according to the second aspect of the present invention.

Preferred Papers

The invention is further illustrated by the following examples in which all parts and percentages are by weight unless specified otherwise. In these Examples the following abbreviations are used:

Paper XA is Xerox 4024 from Rank Xerox.

Paper GB is Gilbert Bond paper from the Mead Corporation.

Paper WC is Wiggins Conqueror High White Wove 100 g/m$^2$ from Arjo Wiggins Ltd.

"–" means not measured.

Water-Dissipatable Polymer ("Resin 1")

To a glass reactor fitted with distillation column and condenser were charged ingredients A, B, D, F, G and 50% of C and 50% of H. The contents were heated with stirring to a reaction temperature of 210° C. until the mixture was clear and the acid value was <10 mgKOH/g. At this point E and the remainder of C and H were charged and the temperature raised to 230° C. The reaction was continued under reduced pressure until an acid value of 5.3 mgKOH/g was obtained. The resin was further characterised by a hydroxyl value=27.6 mgKOHg, ICI Cone and Plate viscosity @125° C.=80 poises and a Tg (onset)=25.4° C. and a number average molecular weight by end group analysis of approximately 2000. The resin was readily dispersed in warm distilled water to give a clear solution having a solids content of 20% w/w (hereinafter "Resin 1").

| Monomer | Abbreviation | Weight (g) |
| --- | --- | --- |
| neopentyl glycol | A | 206.25 |
| diethylene glycol | B | 82.5 |
| isophthalic acid | C | 300 |
| sodio-5-sulpho-isophthalic acid | D | 75 |
| adipic acid | E | 37.5 |
| methoxy PEG 750 | F | 75 |
| sodium acetate | G | 1.5 |
| Fascat 4101 | H | 0.75 |

Water-dissipatable Polymer ("Resin 2")

To a glass reactor fitted with distillation column and condenser were charged ingredients A, B, C, E, G, H and 50% of D and 50% of I. The contents were heated with stirring to a reaction temperature of 210° C. until the mixture was clear and the acid value was 1.25 mgKOH/g. At this point F and the remainder of D and I were charged and the temperature raised to 230° C. The reaction was continued under reduced pressure until an acid value of 2.8 mgKOH/g was obtained. The resin was further characterised by a hydroxyl value=19.7 mgKOH/g, ICI Cone and Plate viscosity @125° C.=90 poises and a Tg (onset)=4° C. The resin was readily dispersed in warm distilled water to give a clear solution having a solids content of 20% w/w. (hereinafter "Resin 2").

| Monomer | Abbreviation | Weight (g) |
| --- | --- | --- |
| neopentyl glycol | A | 653.47 |
| diethylene glycol | B | 479.21 |
| 1,6 hexane diol | C | 396.04 |
| isophthalic acid | D | 1584.16 |

-continued

| Monomer | Abbreviation | Weight (g) |
|---|---|---|
| sodio-5-sulpho-isophthalic acid | E | 396.04 |
| adipic acid | F | 198.02 |
| methoxy PEG 750 | G | 396.04 |
| sodium acetate | H | 8 |
| Fascat 4101 | I | 4 |

Water-Dissipatable Polymer ("Resin 3")

To a glass reactor fitted with distillation column and condenser were charged ingredients A, B, D, E, F, G and 50% of C and 50% of H. The contents were heated with stirring to a reaction temperature of 210° C. until the mixture was clear and the acid value was <10 mgKOH/g. At this point the remainder of C and H were charged and the temperature raised to 230° C. The reaction was continued under reduced pressure until an acid value of 9.4 mgKOH/g was obtained. The resin was further characterised by a hydroxyl value=12.8 mgKOHg, ICI Cone and Plate Viscosity @125° C.=>500 poises and a Tg (onset)=18° C. The number average molecular weight as determined by gel permeation chromatography (PS Equivalents) was 1800. The resin was readily dispersed in warm distilled water to give a clear solution having a solids content of 20% w/w (hereinafter "Resin 3").

| Monomer | Abbreviation | Weight (g) |
|---|---|---|
| neopentyl glycol | A | 15 |
| diethylene glycol | B | 10 |
| isophthalic acid | C | 45 |
| sodio-5-sulpho-isophthalic acid | D | 10 |
| Hexane-1,6-diol | E | 10 |
| Methoxy PEG 750 | F | 10 |
| Sodium acetate | G | 0.2 |
| Fascat 4101 | H | 0.1 |

EXAMPLE 1
Dye (1)

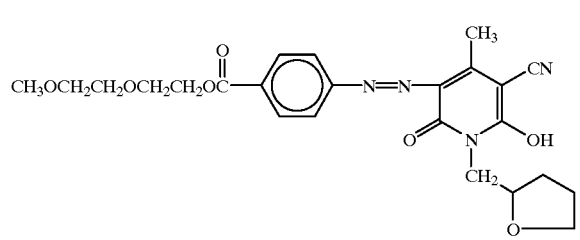

Dye (1)

Dye (1) was prepared using stages 1a to 1c described below:

Stage 1a 4-nitrobenzoylchloride (55.7 g) in $CH_2Cl_2$ (100 ml) was added dropwise to a mixture of 2-(2-methoxyethoxy)ethanol (36 g) and pyridine (32 ml) in $CH_2Cl_2$ (200 ml) keeping the temperature below 10° C. After isolation the resultant nitro compound was converted to the corresponding amino compound using $H_2$ gas and palladium catalyst in ethanol.

Stage 1b

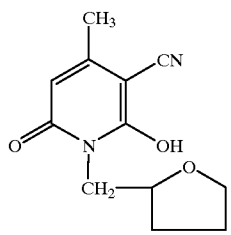

Ethyl acetoacetate (65.07 g) was added dropwise over 30 minutes to a stirred mixture of tetrahydrofurfurylamine (122.92 g) and water (18 g) at room temperature. Ethyl cyanoacetate (56.6 g) was then added. After heating to 90° C. for 20 hours the solution was cooled and poured onto ice (150 g) and acidified by addition of concentrated hydrochloric acid. The product was filtered off, washed with water and dried at 45° C. under reduced pressure to give 91.4 g of the desired product.

Stage 1c

The product from Stage 1a (11.9 g) was added to a mixture of water (30 ml) and hydrochloric acid (12.3 ml) and the solution cooled to 0–5° C. A solution of sodium nitrite (3.46 g) in the minimum of water was then added dropwise keeping the temperature at 0–5° C. After stirring for a further 20 minutes the excess nitrous acid was destroyed by the addition of sulphamic acid. The resulting diazonium salt solution was slowly added to a solution of the product from stage 1b (11.61 g) in methanol (200 ml) keeping the temperature <10° C. After stirring for a further 30 minutes the yellow suspension was diluted with water (200 ml) and the product filtered-off and recrystallised from methanol to give 15.8 g of the title product having a λmax at 434 nm

EXAMPLE 2
Dye (2)

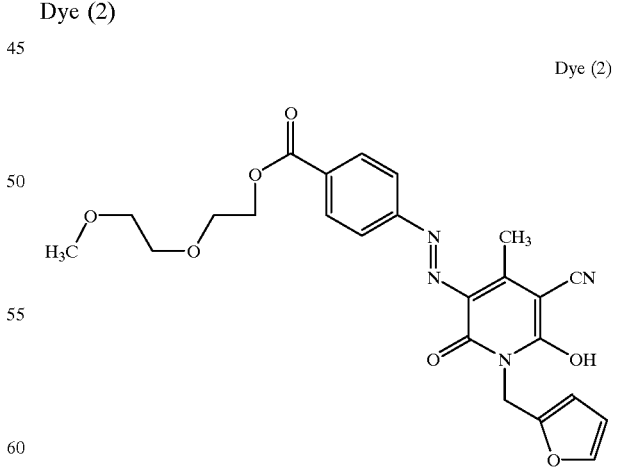

Dye (2)

Dye (2) was prepared using the method of Example 1 except that in stage 1b there was used furfurylamine in place of tetrahydrofurfurylamine.

Dye (2) had a λmax at 436 nm.

EXAMPLE 3

Dye (3)

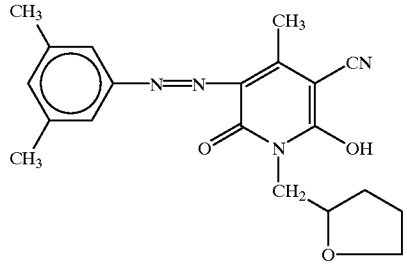

Dye (3) was prepared as described below:

3,5-dimethylaniline (6.08 g) was added to a mixture of water (30 ml) and hydrochloric acid (12.3 ml) and the solution cooled to 0–5° C. A solution of sodium nitrite (3.46 g) in the minimum of water was then added dropwise keeping the temperature at 0–5° C. After stirring for a further 20 minutes the excess nitrous acid was destroyed by the addition of sulphamic acid. The resulting diazonium salt solution was slowly added to a solution of the product from stage 1b of Example 1 (11.61 g) in methanol (200 ml) keeping the temperature <10° C. After stirring for a further 30 minutes the yellow suspension was diluted with water (200 ml) and the product filtered-off and recrystallised from methanol to give the title product.

EXAMPLE 4

Dye (4)

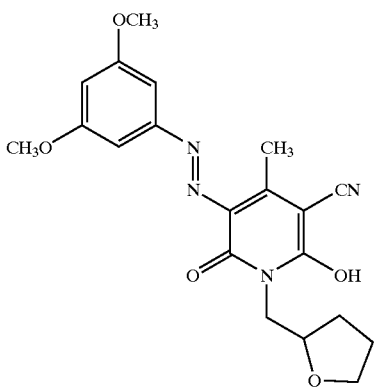

Dye (4) was prepared using the method of Example 3 except that 3,5-dimethoxy aniline was used in place of 3,5-dimethylaniline.

EXAMPLES 5 to 7

Formula (4)

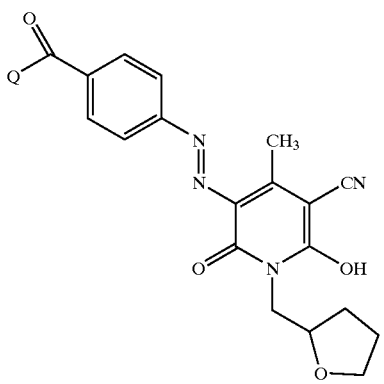

Dyes (5) to (7) of the Formula (4) were prepared using the method described in Example 1 except that is stage 1a there was used the compound of the formula QH shown in Table 1 in place of 2-(2-methoxyethoxyethanol). Dyes (5) to (7) had the $\lambda_{max}$ value shown in Table 1

TABLE 1

| Example | Dye | QH | $\lambda_{max}$ (nm) |
| --- | --- | --- | --- |
| 5 | Dye (5) | triethylene glycol monomethyl ether | 433.6 |
| 6 | Dye (6) | 3-(2-methoxyethoxy)propylamine | 436.4 |
| 7 | Dye (7) | diethylene glycol ethyl ether | 433.6 |

EXAMPLE 8

Dye 8

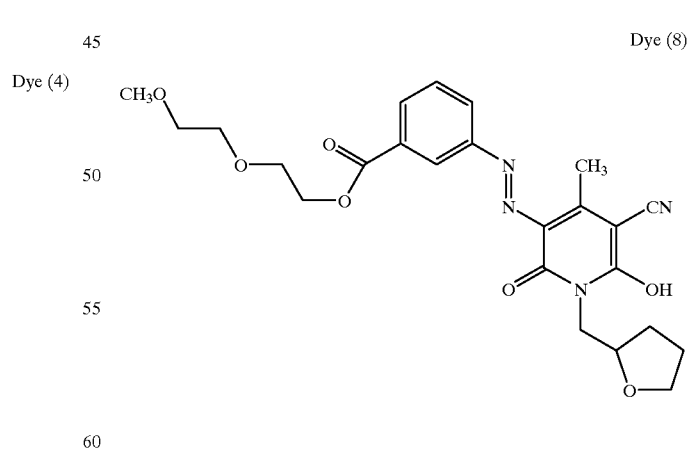

Dye (8) was prepared using the method of Example 1 except that in stage 1a there was used 3-nitrobenzoylchloride in place of 4-nitrobenzoylchloride.

Dye (8) had $\lambda_{max}$ at 432.6.

EXAMPLE 9

Dye (9)

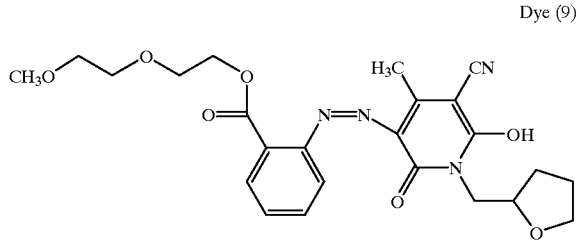

Dye (9) was prepared using the method of Example 1 except that in stage 1a there was used 2-nitrobenzoylchloride in place of 4-nitrobenzoylchloride.

Dye (9) had $\lambda_{max}$ at 432.4.

EXAMPLE 10

Dye (10)

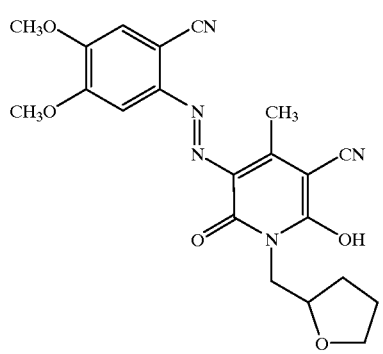

Dye (10) was prepared using the method of Example 3 except that 2-cyano-3,4-dimethoxy aniline was used in place of 3,5-dimethylaniline.

Dye (10) had $\lambda_{max}$ at 460.

EXAMPLE 11

Inks

Inks (1) to (10) with the formulations shown in Table 2 were prepared. In Table 2 the first column indicates the component in the ink and the subsequent columns indicate the number of parts by weight of each component in an ink.

Each ink was prepared by dissolving the dye shown in Table 2 in a mixture comprising benzyl alcohol and 2-pyrrolidone (and morpholine or propylene glycol butyl ether for Inks 2 and 8 respectively). The dye solution was then mixed with the aqueous resin solution/dispersion shown in Table 2 and the resulting mixture was shaken to give a homogenous ink.

TABLE 2

| Component | Ink 1 | Ink 2 | Ink 3 | Ink 4 | Ink 5 | Ink 6 | Ink 7 | Ink 8 | Ink 9 | Ink 10 |
|---|---|---|---|---|---|---|---|---|---|---|
| Dye (1) | 1 | | | | | | | | | |
| Dye (2) | | 1 | | | | | | | | |
| Dye (3) | | | 1 | | | | | | | |
| Dye (4) | | | | 1 | | | | | | |
| Dye (5) | | | | | 3 | | | | | |
| Dye (6) | | | | | | 3 | | | | |
| Dye (7) | | | | | | | 1 | | | |
| Dye (8) | | | | | | | | 1 | | |
| Dye (9) | | | | | | | | | 1 | |
| Dye (10) | | | | | | | | | | 1 |
| Benzyl Alcohol | 10 | 10 | 10 | 10 | 10 | 10 | 10 | 10 | 10 | 10 |
| 2-Pyrrolidone | 20 | 20 | 20 | 20 | 20 | 20 | 20 | 15 | 20 | 20 |
| Morpholine | | 0.5 | | | | | | | | 1 |
| Resin 2* | 50 | 50 | 50 | 50 | | | | 45 | | |
| Resin 3* | | | | | 45 | 45 | 45 | | 50 | 45 |
| Water | 19 | 18.5 | 19 | 19 | 22 | 22 | 24 | 24 | 19 | 23 |
| Propylene glycol butyl ether | | | | | | | | 5 | | |

*20% w/v solution in water at between pH 6.5 and 7.5

EXAMPLE 12

The inks shown in the first column of Table 3 were printed onto the papers listed in Table 3 using a Olivetti JP 450 ink jet printer and tested as follows:

Optical Density and Chroma:

The optical density (OD) and Chroma of a print was measured using an X-Rite 938 Spectrodensitomer.

Water-fastness

The water-fastness (WF) was determined by running water (0.5 ml) down lines of print at an angle of approximately 45° C. immediately after the lines had been printed. The prints were given a score of 1–10 where 1 indicates poor wet fastness and 10 indicates no detected ink run down.

TABLE 3

| Ink | Paper | OD | WF | CHROMA |
|---|---|---|---|---|
| 1 | WC | 0.72 | 9 | 87.97 |
| 2 | XA | 0.76 | 10 | 80.34 |
| 5 | XA | 0.87 | 9 | 88.65 |
| 6 | WC | 0.875 | 9 | 86.11 |
| 7 | WC | 0.69 | 10 | 79.93 |
| 8 | XA | 0.62 | — | 72.63 |
| 9 | XA | 0.62 | — | 71.25 |
| 10 | WC | 1.10 | — | 75.47 |

— Indicates that the water-fastness was not measured.

EXAMPLE 13

Further inks may be prepared having the formulations described in Tables 4 and 5 below wherein the following abbreviations are used. These inks may be applied to a substrate such as plain paper using an ink jet printer.

| | |
|---|---|
| FRU | fructose |
| Resin* | Identifies which of Resins 1, 2 and 3 was used. The number of parts by weight of resins 1, 2 and 3 is shown in brackets. The resin is preferably added as a 20% w/v solution/dispersion in water. |
| BZ | Benzyl alcohol |
| DEG | Diethylene glycol |
| DMB | Diethyleneglycol monobutyl ether |
| ACE | Acetone |
| IPA | Isopropyl alcohol |
| MEOH | Methanol |
| 2P | 2-Pyrrolidone |
| MIBK | Methylisobutyl ketone |
| SUR | Surfynol 465 (a surfactant) |
| PHO | $K_2PO_4$ |
| TEN | triethanolamine |
| NMP | N-methyl pyrrolidone |
| TDG | Thiodiglycol |
| CAP | Caprolactam |
| BUT | Butylcellosolve |

TABLE 4

| Dye | Dye Content | Water | Resin* (parts) | BZ | DEG | ACE | NaOH | $(NH_4)_2SO_4$ | IPA | MEOH | 2P | MIBK | BUT |
|---|---|---|---|---|---|---|---|---|---|---|---|---|---|
| 1 | 2.0 | 58 | 1 (10) | | 6 | 4 | | | | | 10 | 10 | |
| 2 | 3.0 | 61.8 | 1 (10) | 5 | 5 | | | 0.2 | | | 15 | | |
| 1 | 2.1 | 60.9 | 2 (6) | 8 | | | | | | | 20 | 1 | 2 |
| 3 | 1.1 | 61.9 | 2 (12) | | 9 | | 0.5 | 0.5 | | | 9 | 5 | 1 |
| 1 + 2 | 5 | 54 | 3 (5) | 15 | 3 | 3 | | | 6 | | | 5 | 4 |
| 4 | 5 | 50 | 2 (15) | 20 | | | | | 10 | | | | |
| 2 | 2.4 | 51.6 | 1 (5) | 4 | | 5 | | | | 6 | 20 | 5 | 1 |
| 3 | 4.1 | 68.6 | 3 (10) | 5 | 2 | 10 | | 0.3 | | | | | |
| 1 | 3.2 | 57.8 | 2 (4) | 5 | 4 | 6 | | | 5 | 4 | 6 | 5 | |
| 1 | 5 | 70 | 3 (10) | 6 | 2 | 2 | | | 1 | | 4 | | |
| 4 | 1.8 | 63.2 | 2 (10) | 5 | | | | | | | 15 | | 5 |
| 1 | 3.3 | 63.7 | 2 (12) | | | 10 | | | | 2 | | 6 | 3 |
| 2 | 2.0 | 62.7 | 3 (5) | 10 | | 7 | 0.3 | | 3 | | 10 | | |
| 3 | 5.4 | 49.6 | 1 (4) | 20 | 2 | 1 | | | | | 15 | 3 | |
| 1 | 1.0 | 63 | 1 (7) | 5 | 4 | | | | | | 15 | 5 | |

TABLE 5

| Dye | Dye Content | Water | Resin* (parts) | BZ | NMP | SUR | TEN | TDG | FRU | PHO | DMB | $CH_3NH_2$ | CAP |
|---|---|---|---|---|---|---|---|---|---|---|---|---|---|
| 3 | 1.5 | 63 | 1 (10) | 5 | | 0.15 | 0.5 | 20 | | | | | |
| 1 | 2.5 | 60 | 2 (15) | 6 | 15 | | | | | 0.12 | | | 4 |
| 1 | 3.1 | 64 | 3 (10) | 8 | | 0.3 | | 15 | | | 0.2 | | |
| 3 | 0.9 | 63 | 1 (5) | 10 | 20 | | | | 0.5 | 0.2 | | | |
| 3 | 8.0 | 40 | 1 (15) | 15 | 15 | | | 5 | | | | | 2 |
| 2 | 4.0 | 67 | 2 (10) | 10 | 4 | | | | 1 | | 4 | 0.2 | |
| 4 | 2.2 | 67 | 2 (10) | 10 | 3 | | | | 2 | | 6 | | |
| 2 | 9.0 | 54 | 3 (15) | 9 | 7 | 0.5 | | | | 0.95 | 5 | | |
| 3 | 5.0 | 57 | 2 (10) | 11 | | | | 10 | | | 6 | | 1 |
| 1 | 5.4 | 54 | 3 (12) | 5 | 17 | | | | | | 7 | | |
| 3 | 2.1 | 65 | 1 (15) | 5 | 5 | 0.1 | 0.2 | 2 | 0.5 | 0.1 | 5 | | |
| 2 | 2 | 56 | 2 (10) | 10 | 5 | | | 12 | | | 5 | | |
| 4 | 6 | 44 | 3 (20) | 5 | 8 | | | | | | 5 | | 12 |
| 1 | 8 | 50 | 2 (13) | 15 | 2 | | | | | | 12 | | |
| 1 | 1.0 | 80 | 1 (5) | 10 | | | 1 | 1 | | | | 1 | 1 |

What is claimed is:

1. A dye of Formula (1) or tautomer thereof:

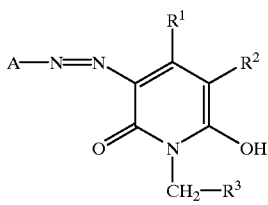

Formula (1)

wherein:
A is di-, tri-, tetra- or penta-substituted phenyl;
$R^1$ is methyl;
$R^2$ is H, CN, alkyl, substituted alkyl, alkenyl, substituted alkenyl, alkynyl, substituted alkynyl, aryl, substituted aryl or a carbonamido group; and
$R^3$ is 5- or 6-membered ring comprising carbon atoms and one or two O, N and/or S atoms, wherein the ring may be substituted.

2. A dye according to claim 1, wherein the substituents present on A are the same or different and are selected from the group consisting of alkoxy, alkyl, halo, nitro, hydroxy, amino, substituted amino, $CO_2R^5$, $OCOR^5$, $COR^5$, $COCOR^5$, $SO_2R^5$, $SO_2NH_2$, $SO_2NR^5R^6$, $SOR^5$, $SO_2OR^5$, CN, $CONR^5R^6$, $CONH_2$, $NHCOR^5$, $CF_3$, $CO_2R^7$, and $CONHR^7$;
wherein:
each $R^5$ independently represents phenyl, substituted phenyl, alkyl or substituted alkyl which may be interrupted by one or more oxygen, sulphur or nitrogen atoms;
each $R^6$ independently represents H or a substituent as defined for $R^5$; or $R^5$ and $R^6$ together with the nitrogen to which they are attached form a 5 or 6 membered ring;
each $R^7$ independently represents $[(CH_2)_mO]_nR^8$, wherein $R^8$ represents H or $C_{1-4}$-alkyl;
m is 2 or 3; and
n is 1, 2, 3 or 4.

3. A dye according to claim 2 wherein $R^8$ represents H.

4. A dye according to any one of claims 1, 2 or 3 wherein $R^3$ is furanyl, substituted furanyl, tetrahydrofuranyl or substituted tetrahydrofuranyl.

5. A dye according to claim 2, having the Formula (2) or tautomer thereof:

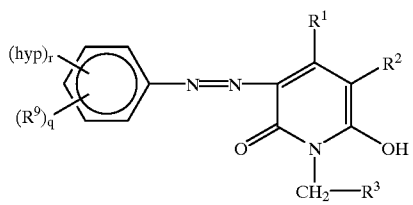

Formula (2)

wherein:
each hyp independently is a group of the formula $CO_2R^5$, $OCOR^5$, $COR^5$, $COCOR^5$, $SO_2R^5$, $SO_2NHR^5$, $SO_2NH_2$, $SO_2NR^5R^5$, $SO_2OR^5$, CN, $CONHR^5$, $CF_3$, $CONHR^7$; or $CO_2R^7$;
each $R^9$ independently is $C_{1-4}$-alkoxy, halo $C_{1-4}$-alkyl; nitro, hydroxy, amino or substituted amino;

$R^1$ is methyl;
$R^2$ is H, CN, alkyl, substituted alkyl, alkenyl, substituted alkenyl, alkynyl, substituted alkynyl, aryl, substituted aryl or a carbonamido group;
$R^3$ is 5- or 6-membered ring comprising carbon atoms and one or two O, N and/or S atoms,
r is 1 or 2;
q is 1 or 2;
(r+q) is 2, 3 or 4; and
$R^7$ and each $R^5$, independently, are as defined.

6. A dye according to claim 1 or claim 5, wherein $R^3$ is a 5- or 6-membered ring comprising one O or S atom and four or five carbon atoms.

7. A dye according to claim 1 or claim 5 wherein $R^3$ is furanyl or tetrahydrofuranyl.

8. A dye according to claim 1 or claim 5, wherein $R^2$ is CN or a carbonamido group.

9. A dye according to claim 5, wherein q is 0; r is 1; hyp is $CO_2R^7$; $R^1$ is methyl; $R^2$ is CN; $R^3$ is furanyl or tetrahydrofuranyl; and $R^7$ is $[(CH_2)_mO]_nR^8$, wherein $R^8$ is H or $C_{1-4}$-alkyl, m is 2 or 3, and n is 1, 2, 3 or 4.

10. A dye according to claim 5, wherein r is 0; q is 2; $R^9$ is alkyl or alkoxy; $R^1$ is methyl; $R^2$ is CN; and $R^3$ is furanyl or tetrahydrofuranyl.

11. An ink comprising an aqueous medium, a water-dissipatable polymer bearing ionised carboxy and/or sulphonate groups and a dye of the Formula (1) or a tautomer thereof:

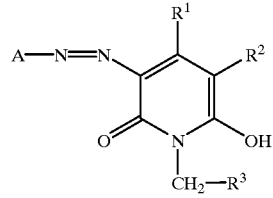

Formula (1)

wherein:
A is phenyl or substituted phenyl;
$R^1$ is methyl;
$R^2$ is H, CN, alkyl, substituted alkyl, alkenyl, substituted alkenyl, alkynyl, substituted alkynyl, aryl, substituted aryl or a carbonamido group; and
$R^3$ is 5- or 6-membered ring which may be substituted.

12. An ink according to claim 11, wherein the water-dissipatable polymer is a water-dissipatable polyester.

13. An ink according to claim 11 or claim 12, wherein the water-dissipatable polyester has an Mn of up to 30,000.

14. An ink according to claim 11 or 12, comprising:
(a) from 0.5 to 10 parts of the dye of Formula (1);
(b) from 2 to 25 parts of the water-dissipatable polymer;
(c) from 40 to 90 parts of water; and
(d) from 0 to 60 parts of an organic solvent;
wherein all parts are by weight and the total number of parts of (a)+(b)+(c)+(d) add up to 100.

15. An ink according to claim 11 or claim 12, further comprising a water-miscible organic solvent and a water-immiscible organic solvent.

16. An ink according to claim 14, wherein component (d) is present and comprises:
(i) 5 to 50% by weight of a water-immiscible alcohol having at least six carbon atoms; and (ii) 50 to 95% by weight of a water-miscible solvent comprising:
(a) a cyclic ester or cyclic amide;
(b) a water-miscible $C_{1-6}$-alkyl mono ether of a $C_{2-6}$-alkylene glycol or $C_{1-6}$-alkyl mono ether of poly ($C_{1-6}$-alkylene glycol); or
(c) a mixture of (a) and (b); wherein the total amount of (i) and (ii) is 100%.

17. A process for printing an image on a substrate comprising applying thereto, by an ink jet printer, an ink containing a dye according to claim 11 or claim 12.

18. A process for printing an image on a substrate comprising applying thereto, by an ink jet printer, an ink comprising an aqueous medium, a water-dissipatable polymer and a dye of the Formula (1) or a tautomer thereof;

Formula (1)

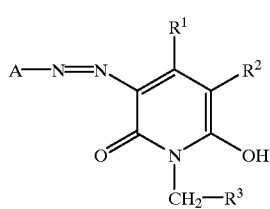

wherein:
A is phenyl or substituted phenyl;
$R^1$ is methyl;
$R^2$ is H, CN, alkyl, substituted alkyl, alkenyl, substituted alkenyl, alkynyl, substituted alkynyl, aryl, substituted aryl or a carbonamido group; and
$R^3$ is 5- or 6-membered ring which may be substituted.

19. A paper, an overhead projector slide or a textile material printed with an ink according to claim 1 or claim 2.

20. A paper, an overhead projector slide or a textile material according to claim 19, which is printed with said ink using an ink jet printer.

21. A process according to claim 17, wherein said substrate is paper, overhead projector slide or textile material.

22. A process according to claim 18, wherein said substrate is paper, overhead projector slide or textile material.

23. A paper, overhead projection slide or textile material printed by the process of claim 21.

24. A paper, overhead projection slide or textile material printed by the process of claim 22.

25. An ink jet printer cartridge comprising a cartridge and an ink wherein the ink comprises an aqueous medium, a water-dissipatable polymer and a dye of Formula (1) or a tautomer thereof:

Formula (1)

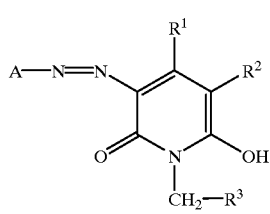

wherein:

A is phenyl or substituted phenyl;
$R^1$ is methyl;
$R^2$ is H, CN, alkyl, substituted alkyl, alkenyl, substituted alkenyl, alkynyl, substituted alkynyl, aryl, substituted aryl or a carbonamido group; and
$R^3$ is 5- or 6-membered ring which may be substituted.

26. An ink according to claim 11, wherein A is a di-, tri-, tetra-, or penta-substituted phenyl.

27. An ink according to claim 26, wherein the substituents on the phenyl are the same or different and are selected from the group consisting of alkoxy, alkyl, halo, nitro, hydroxy, amino, substituted amino, $CO_2R^5$, $OCOR^5$, $COR^5$, $COCOR^5$, $SO_2R^5$, $SO_2NH_2$, $SO_2NR^5R^6$, $SOR^5$, $SO_2OR^5$, CN, $CONR^5R^6$, $CONH_2$, $NHCOR^5$, $CF_3$, $CO_2R^7$, $CONHR^7$;
wherein:
each $R^5$ independently represents phenyl, substituted phenyl, alkyl or substituted alkyl which may be interrupted by one or more oxygen, sulphur or nitrogen atoms;
each $R^6$ independently represents H or a substituent as defined for $R^5$; or $R^5$ and $R^6$ together with the nitrogen to which they are attached form a 5 or 6 membered ring;
each $R^7$ independently represents $[(CH_2)_mO]_nR^8$, wherein $R^8$ represents H or $C_{1-4}$-alkyl;
m is 2 or 3; and
n is 1, 2, 3 or 4.

28. An ink according to claim 11, wherein said dye has the following Formula (2) or tautomer thereof:

Formula (2)

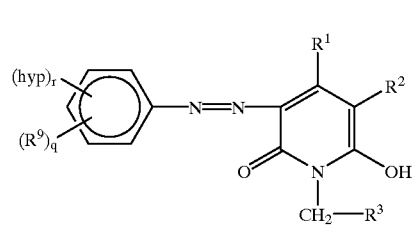

wherein:
each hyp independently is a group of the formula $CO_2R^5$, $OCOR^5$, $COR^5$, $COCOR^5$, $SO_2R^5$, $SO_2NHR^5$, $SO_2NH_2$, $SO_2NR^5R^5$, $SO_2OR^5$, CN, $CONHR^5$, $CF_3$, $CONHR^7$; or $CO_2R^7$;
each $R^9$ independently is $C_{1-4}$-alkoxy, halo, $C_{1-4}$-alkyl, nitro, hydroxy, amino or substituted amino;
$R^1$ is methyl;
$R^2$ is H, CN, alkyl, substituted alkyl, alkenyl, substituted alkenyl, alkynyl, substituted alkynyl, aryl, substituted aryl or a carbonamido group;
$R^3$ is 5- or 6-membered ring comprising carbon atoms and one or two O, N and/or S atoms,
r is 1 or 2;
q is 1 or 2;
(r+q) is 2, 3 or 4; and
$R^7$ and each $R^5$, independently, are as defined.

* * * * *